United States Patent
Yamaguchi (10) Patent No.: US 9,586,520 B2
(45) Date of Patent: Mar. 7, 2017

(54) DIRECTIONAL INDICATOR AND STRADDLE TYPE VEHICLE DIRECTIONAL INDICATOR SYSTEM INCLUDING THE SAME

(71) Applicant: YAMAHA HATSUDOKI KABUSHIKI KAISHA, Shizuoka-ken (JP)

(72) Inventor: Takao Yamaguchi, Shizuoka (JP)

(73) Assignee: YAMAHA HATSUDOKI KABUSHIKI KAISHA, Iwata-shi, Shizuoka-ken (JP)

( * ) Notice: Subject to any disclaimer, the term of this patent is extended or adjusted under 35 U.S.C. 154(b) by 706 days.

(21) Appl. No.: 13/916,152

(22) Filed: Jun. 12, 2013

(65) Prior Publication Data
US 2014/0015665 A1 Jan. 16, 2014

(30) Foreign Application Priority Data
Jul. 12, 2012 (JP) .................................. 2012-156133

(51) Int. Cl.
B60Q 1/34 (2006.01)
B60Q 11/00 (2006.01)
B60Q 1/00 (2006.01)
H05B 33/08 (2006.01)

(52) U.S. Cl.
CPC ............ *B60Q 1/34* (2013.01); *B60Q 1/0088* (2013.01); *B60Q 11/007* (2013.01); *H05B 33/089* (2013.01); *H05B 33/083* (2013.01); *H05B 33/0827* (2013.01)

(58) Field of Classification Search
None
See application file for complete search history.

(56) References Cited

U.S. PATENT DOCUMENTS

| | | | |
|---|---|---|---|
| 7,382,241 B1 * | 6/2008 | Huang | B60Q 1/38 340/475 |
| 8,531,116 B2 * | 9/2013 | Min | H05B 33/0818 315/130 |
| 2003/0222774 A1 * | 12/2003 | Koenigsberg | B60T 8/885 340/453 |
| 2003/0227257 A1 | 12/2003 | Serizawa et al. | |
| 2008/0007180 A1 * | 1/2008 | Kesterson | B60Q 1/2603 315/82 |

(Continued)

FOREIGN PATENT DOCUMENTS

| | | |
|---|---|---|
| EP | 2 080 695 A1 | 7/2009 |
| EP | 2 088 834 A1 | 8/2009 |

(Continued)

*Primary Examiner* — Mohamed Barakat
(74) *Attorney, Agent, or Firm* — Rabin & Berdo, P.C.

(57) ABSTRACT

A directional indicator system includes a directional indicator that includes a plurality of LED series circuits each connected in parallel to another of the LED series circuits. Each LED series circuit includes LEDs connected in series. A driver is configured to control driving of the directional indicator. The driver includes LED drivers that are each configured to drive a corresponding one of the LED series circuits. The driver also includes a plurality of current detectors that are each configured to measure a value of a current in a corresponding one of the LED series circuits.

18 Claims, 5 Drawing Sheets

(56) References Cited

U.S. PATENT DOCUMENTS

| | | | |
|---|---|---|---|
| 2009/0185388 A1* | 7/2009 | Kageyama | B62J 6/005 362/473 |
| 2009/0187925 A1 | 7/2009 | Hu et al. | |
| 2010/0156324 A1* | 6/2010 | Nagase | H05B 33/089 315/307 |
| 2010/0219771 A1* | 9/2010 | Fukui | H05B 33/0803 315/294 |
| 2011/0273112 A1* | 11/2011 | Lee | H05B 33/0887 315/297 |

FOREIGN PATENT DOCUMENTS

| | | |
|---|---|---|
| JP | 49-060670 U | 5/1974 |
| JP | 62-285303 | 12/1987 |
| JP | 2004-009825 A | 1/2004 |

* cited by examiner

DIRECTIONAL INDICATOR AND STRADDLE TYPE VEHICLE DIRECTIONAL INDICATOR SYSTEM INCLUDING THE SAME

CROSS-REFERENCE TO RELATED APPLICATION

This application is based on, and claims priority to, Japanese Patent Application No. 2012-156133, filed on Jul. 12, 2012 the contents of which are incorporated herein by reference.

BACKGROUND

Technical Field

The present invention relates to a directional indicator for a straddle type vehicle and a directional indicator system including the same.

Description of the Background Art

As disclosed in JP 2004-9825 A, a vehicle lamp fitting including a plurality of light-emitting diodes (LEDs) is known. Such a vehicle lamp fitting includes a light emitter having a plurality of light emitting units connected in parallel, each light emitting unit having two LEDs connected in series.

The above vehicle lamp fitting uses one power source to control the power supply to the plurality of light emitting units. The vehicle lamp fitting further include a single break detecting means for the plurality of light emitting units. More specifically, in the vehicle lamp fitting, a comparator is provided at the junction of the plurality of light emitting units for detecting a break based on the value of the current flowing through the LEDs.

SUMMARY

In the arrangement of JP 2004-9825 A, the break detecting means is capable of detecting any failure or the like of one of the plurality of LEDs that constitute the light emitter. However, the arrangement of JP 2004-9825 A is not suitable for determining the number of LEDs that failed since it measures the entire amount of current in the light emitter. This means that the amount of current of the directional indicator cannot be correctly determined. Thus, the arrangement of JP 2004-9825 A is not suitable for determining whether the directional indicator is emitting a sufficient amount of light.

The amount of current flowing through the LEDs is small. This means that, if the voltage applied to the directional indicator decreases, changes in the amount of current measured when an LED fails are small, as well. In such cases, the arrangement of JP 2004-9825 A is not suitable for detecting a failure of an LED since changes in the entire amount of current when an LED fails are small. Specific examples of cases where the voltage applied to the directional indicator decreases include, for example, a deterioration in the battery, a battery failure, a decrease in battery charge, a generator failure, and a combination thereof.

An object of the present invention is to realize a straddle type vehicle directional indicator system that is capable of correctly detecting a failure of an LED.

A straddle type vehicle directional indicator system according to an embodiment of the present invention includes a directional indicator and a driver for controlling driving of the directional indicator. The directional indicator includes a plurality of LED series circuits, each LED series circuit having a plurality of LEDs connected in series. The plurality of LED series circuits are connected in parallel. The driver includes a plurality of LED drivers each for driving a corresponding one of the plurality of LED series circuits and a plurality of current detectors each for measuring the value of current in a corresponding one of the plurality of LED series circuits.

In an arrangement including LED series circuits connected in parallel, where each LED series circuit has a plurality of LEDs connected in series, the current in the plurality of LED series circuits may be measured to detect a failure in the LED series circuits more correctly. Thus, a failure in the LED series circuits may be easily detected.

DESCRIPTION OF THE EMBODIMENTS

Embodiments will be described with reference to the drawings. The sizes of the components in the drawings do not exactly represent the sizes of the actual components and the size ratios or the like of the components.

In the following description, the directions "front/forward", "rear(ward)", "left" and "right" mean directions as perceived by a rider sitting on the seat 6 of the motorcycle 1 and grasping the handlebars 5.

<Overall Configuration of Motorcycle>

Figure 1:
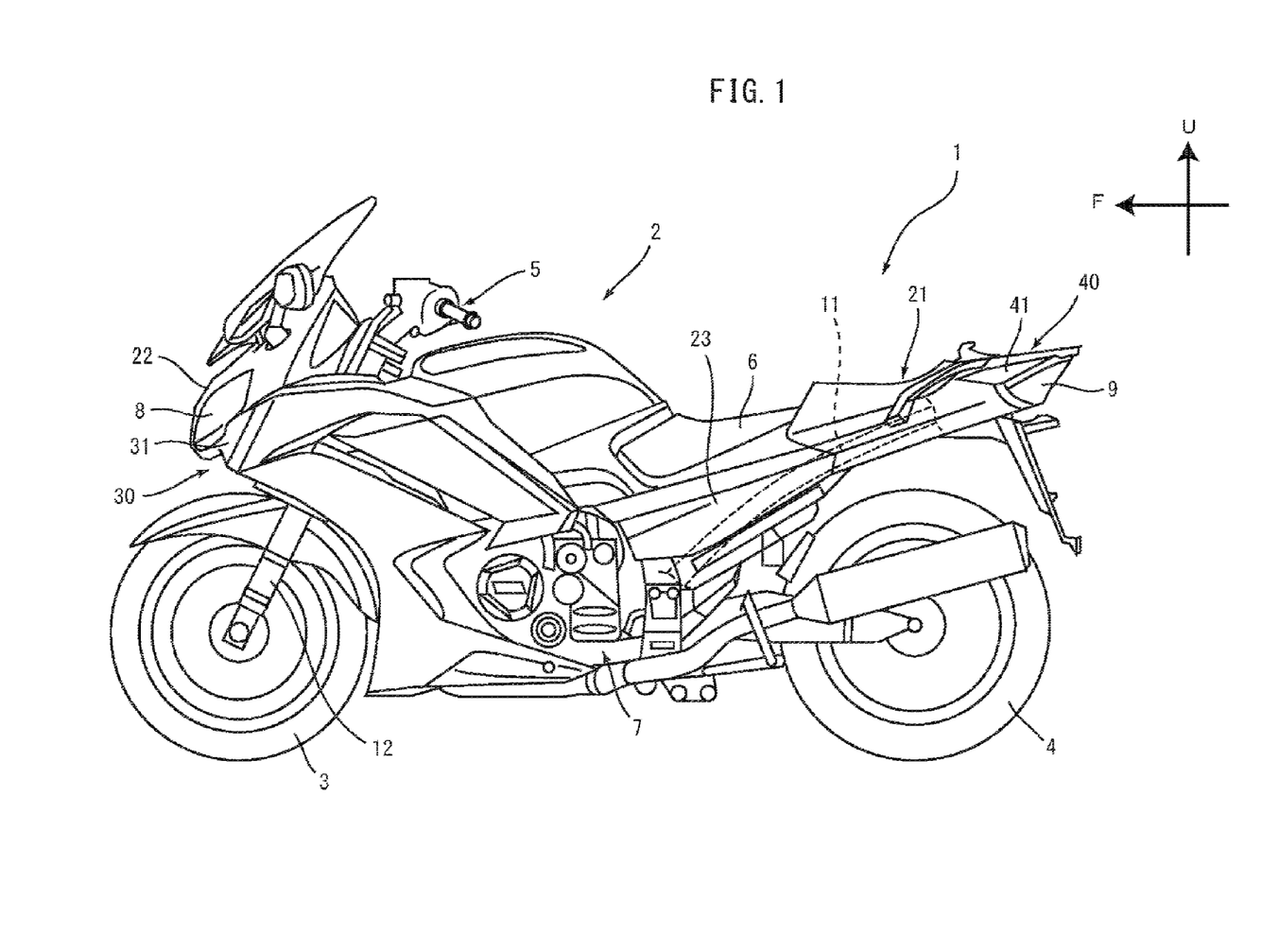
FIG. 1 is a left side view of an entire motorcycle according to an embodiment of the present invention.

FIG. 1 is a left side view of an entire motorcycle 1 (straddle type vehicle) according to an embodiment of the present invention. The motorcycle 1 includes a vehicle body 2, a front wheel 3 located forward of the vehicle body 2, and a rear wheel 4 located rearward of the vehicle body 2. Arrow "F" in FIG. 1 indicates the forward direction with respect to the motorcycle 1, and arrow "U" indicates the upward direction with respect to the motorcycle 1.

The vehicle body 2 includes a body frame 11, a body cover 21, handlebars 5, a seat 6, and a power unit 7. The vehicle body 2 includes, in a front portion of the vehicle, a head lamp 8 and a front directional indicator 30. The vehicle body 2 includes, in a rear portion of the vehicle, a tail lamp 9 and a rear directional indicator 40 (bulb body directional indicator). Particularly, the vehicle body 2 includes a directional indicator system 50 including the front directional indicator 30 and rear directional indicator 40 (see FIG. 2). The front directional indicator 30 includes a front left directional indicator 31 and a front right directional indicator 32. The rear directional indicator 40 includes a rear left directional indicator 41 and a rear right directional indicator 42.

The vehicle frame 11 includes, in addition to a main frame and down frame, not shown, a head pipe, not shown, located in the front portion of the motorcycle 1. A steering shaft, not shown, is located within the head pipe.

The handlebars 5 are connected with the top of the steering shaft, the handlebars being rotatable relative to the head pipe. Front suspensions 12, with these tubes disposed parallel to each other, are connected with the steering shaft (see FIG. 1). The front wheel 3 is rotatably connected to the bottom of the front suspensions 12.

The body cover 21 covers the body frame 11. The body cover 21 is made of a resin material, for example. As shown in FIG. 1, the body cover 21 includes a front cowl 22 located in the front portion of the vehicle and a seat cowl 23 located in the rear portion of the vehicle.

<Directional Indicator System>

Figure 2:
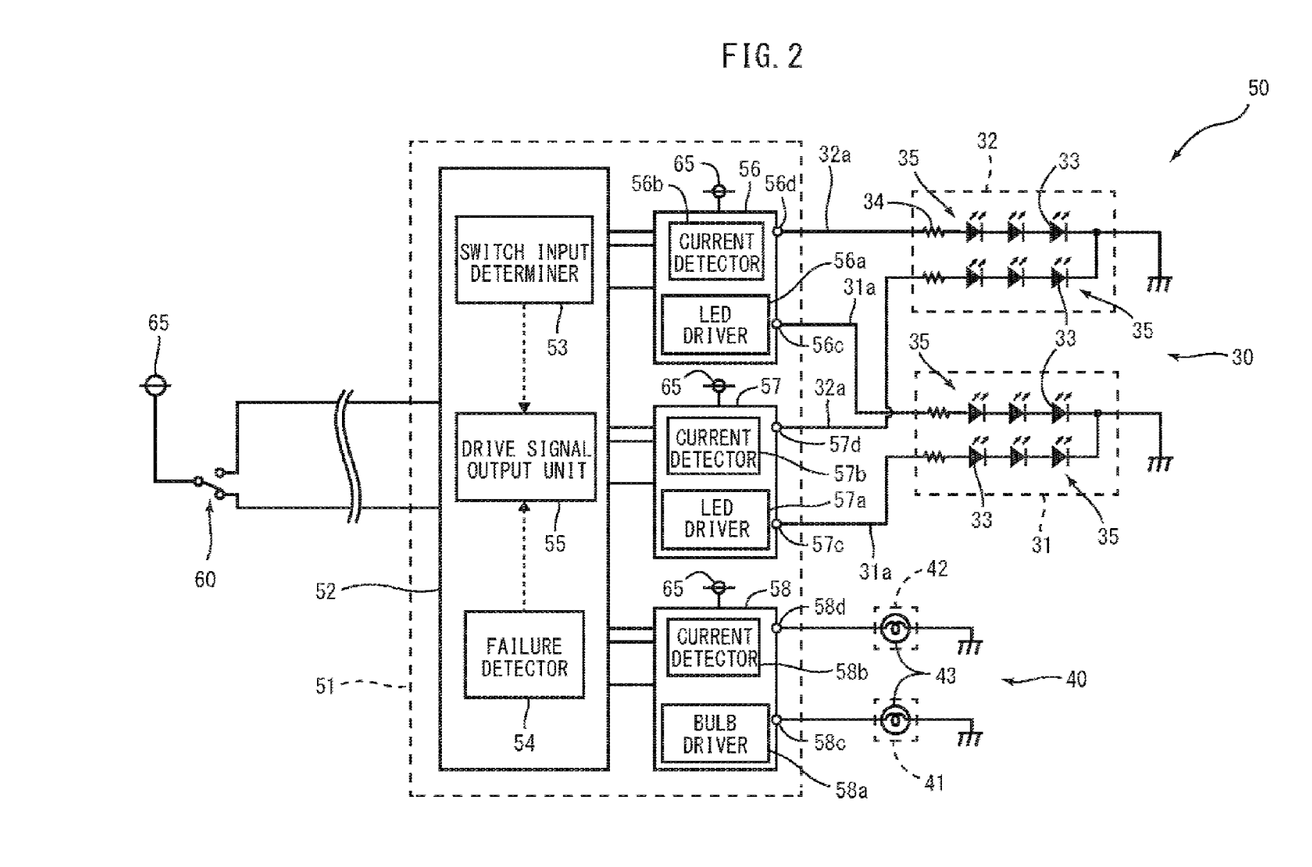
FIG. 2 schematically illustrates the entire directional indicator system of the motorcycle.

FIG. 2 schematically illustrates the directional indicator system 50. The directional indicator system 50 causes the front directional indicator 30 and rear directional indicator 40 to blink on and off based on an input by the rider when he intends the motorcycle 1 to turn left or right. Specifically, when the rider operates the blinker switch 60 (see FIG. 2) provided on the handlebars 5, the directional indicator system 50 causes the combination of the front left directional indicator 31 and rear left directional indicator 41 or that of the front right directional indicator 32 and rear right directional indicator 42 to blink. The directional indicator system 50 may also be configured to cause the entire front directional indicator 30 and rear directional indicator 40 to blink when the driver presses a hazard switch, not shown.

As shown in FIG. 2, the directional indicator system 50 includes a driver 51, the front left directional indicator 31, the front right directional indicator 32, the rear left directional indicator 41 and the rear right directional indicator 42.

The front left directional indicator 31 and front right directional indicator 32 each include a light emitter composed of LEDs 33. The front left directional indicator 31 and front right directional indicator 32 each include a plurality of LED series circuits 35 (two in the present embodiment), each having a plurality of LEDs 33 (three LEDs in the present embodiment) connected in series. In each of the front left directional indicator 31 and front right directional indicator 32, the LED series circuits 35 are connected in parallel. That is, in the present embodiment, two LED series circuits 35 are connected in parallel in each of the front left directional indicator 31 and front right directional indicator 32.

In each of the front left directional indicator 31 and front right directional indicator 32, each of the LED series circuits 35, connected in parallel, has a junction connected to the negative electrode of a battery 65.

Each LED series circuit 35 includes, on its current input side, a resistor 34 for converting the amount of current provided to the LED series circuit 35 to an amount of current suitable for the LEDs 33.

The side of each LED series circuit 35 having the resistor 34 (current input side) is connected to an LED driver circuit 56 or 57, detailed below, in the driver 51. The two LED series circuits 35 in the left front directional indicator 31 are each connected with different LED driver circuits. Similarly, the two LED series circuits 35 in the front right directional indicator 32 are each connected with different LED driver circuits. That is, in the present embodiment, one LED driver circuit is connected with one LED series circuit 35 of the front left directional indicator 31 and one LED series circuit 35 of the front right directional indicator 32.

Two connection lines 31a and two connection lines 32a extend from the front left directional indicator 31 and front right directional indicator 32, respectively to the outside. That is, the connection lines 31a and 32a are connected with the LED series circuits 35 of the front left directional indicator 31 and those of the front right directional indicator 32, respectively. As shown in FIG. 2, one of the two connection lines 31a extending from the front left directional indicator 31 is connected with the LED driver circuit 56, discussed below, of the driver 51 and the other one is connected with the LED driver circuit 57 of the driver 51. One of the two connection lines 32a extending from the front right directional indicator 32 is connected with the LED driver circuit 56, discussed below, of the driver 51 and the other one is connected with the LED driver circuit 57 of the driver 51.

The rear left directional indicator 41 and rear right directional indicator 42 each have a bulb 43 (bulb body). That is, each of the rear left directional indicator 41 and rear right directional indicator 42 has a light emitter composed of bulbs 43. The bulbs 43 are connected with a bulb driver circuit 58, discussed below, of the driver 51. Thus, the bulbs 43 of the rear left directional indicator 41 and rear right directional indicator 42 are connected with one bulb driver circuit 58.

In response to the rider operating the blinker switch 60 on the handlebars 5, the driver 51 causes a current to flow through the front directional indicator 30 and rear directional indicator 40.

In particular, when the rider operates the blinker switch 60 to cause the directional indicator system 50 to indicate a left turn (i.e. when the switch is closed to the lower contact point in FIG. 2), the driver 51 causes a current to flow intermittently through the front left directional indicator 31 and rear left directional indicator 41 to cause them to blink.

On the other hand, when the rider operates the blinker switch 60 to cause the directional indicator system 50 to indicate a right turn (when the switch is closed to the upper contact point in FIG. 2), the driver 51 causes a current to flow intermittently through the front right directional indicator 32 and rear right directional indicator 42 to cause them to blink.

As shown in FIG. 2, the driver 51 includes a drive control unit 52, a plurality of LED driver circuits 56 and 57 and a bulb driver circuit 58. In response to a signal input by the blinker switch 60 being operated, the drive control unit 52 outputs a drive signal to the LED driver circuits 56 and 57 and bulb driver circuit 58. In addition, the drive control unit 52 examines the LED series circuits 35 and bulb 43 for a failure based on signals indicative of current values that are provided by the LED driver circuits 56 and 57 and bulb driver circuit 58.

In particular, as shown in FIG. 2, the drive control unit 52 includes a switch input determiner 53, a failure detector 54 and a drive signal output unit 55. The switch input determiner 53 determines whether the blinker switch 60 has been operated and, based on a signal input by the blinker switch 60, determines whether a right turn or a left turn is to be indicated. That is, the switch input determiner 53 receives a signal transmitted via the two lines extending from the blinker switch 60 and evaluates the input at the blinker switch 60. The switch input determiner 53 outputs the evaluation to the drive signal output unit 55 (an arrow with a broken line in FIG. 2).

The failure detector 54 detects a failure in the LED series circuits 35 and bulbs 43 based on signals indicative of current values provided by the LED driver circuits 56 and 57 and bulb driver circuit 58. That is, the LED driver circuits 56 and 57 and bulb driver circuit 58 are configured to measure the current in the LED series circuits 35 and bulbs 43, as will be discussed below. The values of current measured by the LED driver circuits 56 and 57 and bulb driver circuit 58 are input to the drive control unit 52 in the form of signals. In the drive control unit 52, the failure detector 54 compares the input signals with a threshold value of current and, based on the results, determines whether there is a failure (i.e. a break or short circuit).

Specifically, the failure detector 54 determines that there is a break if a current value measured by an LED driver circuit 56 or 57 or bulb driver circuit 58 is not larger than the current value experienced following a break (break current value). The failure detector 54 determines that there is a short circuit if a current value measured by an LED current circuit 56 or 57 or bulb driver circuit 58 is not smaller than the current value experienced following a short circuit (short circuit current value).

The failure detector 54 examines each of the LED series circuits 35 and each of the bulbs 43 for a failure based on current values measured by the LED driver circuits 56 and 57 and bulb driver circuit 58. Thus, the failure detector 54 is capable of determining in which of the LED series circuits 35 and bulbs 43 there is a failure.

Thus, the failure detector 54 is capable of determining in which of the LED series circuits 35 and bulbs 43 there is a failure and what kind of failure. When the failure detector 54 detects a failure, it informs the drive signal output unit 55 (an arrow with a broken line in FIG. 2).

Based on a signal provided by the switch input determiner 53, the drive signal output unit 55 provides drive signals to the LED driver circuits 56 and 57 and bulb driver circuit 58. That is, when the switch input determiner 53 determines that the blinker switch 60 has been operated to indicate a left turn, the drive signal output unit 55 provides drive signals to the LED driver circuits 56 and 57 and bulb driver circuit 58 to cause the front left directional indicator 31 and rear left directional indicator 41 to blink. On the other hand, when the switch input determiner 53 determines that the blinker switch 60 has been operated to indicate a right turn, the drive signal output unit 55 provides drive signals to the LED driver circuits 56 and 57 and bulb driver circuit 58 to cause the front right directional indicator 32 and rear right directional indicator 42 to blink.

The drive signal output unit 55 delays the output of drive signals to the LED drivers 56a and 57a, discussed below, in the LED driver circuits 56 and 57 relative to the output of drive signals to the bulb driver 58a, discussed below, in the bulb driver circuit 58 by a predetermined period of time. Generally, the bulbs 43 take a longer time than the LEDs 33 from the point of time where a current begins to flow therethrough until a predetermined brightness of lighting is reached. Thus, as shown in FIG. 4, the drive signal output unit 55 delays the output of drive signals to the LED driver circuits 56 and 57 (FIG. 4(a)) relative to the output of drive signals to the bulb driver circuit 58 (FIG. 4(b)) by the time T.

The time T is a difference between the point of time where the LEDs 33 begin to shine at a predetermined brightness and the point of time where the bulbs 43 begin to shine at a predetermined brightness if a current begins to flow through the LEDs 33 and bulbs 43 at the same time.

Thus, the bulb driver circuit 58 is capable of supplying a current to the bulbs 43 earlier than the LED driver circuits 56 and 57 supply a current to the LED series circuits 35. This allows the bulbs 43 and LEDs 33 to begin to shine at the same time.

Figure 4:
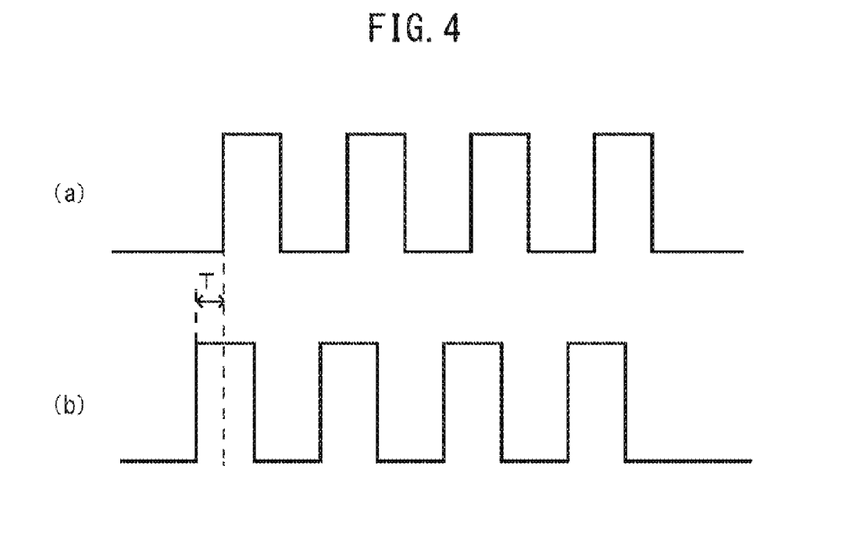
FIG. 4 illustrates (a) a waveform of a drive signal provided to the LED driver circuits by the drive signal output unit and (b) a waveform of a drive signal provided to the bulb driver circuit by the drive signal output unit.

The drive signals are represented by a square wave as shown in FIG. 4. Accordingly, the bulbs 43 may be turned off earlier than LEDs 33 by changing the timing of the drive signals in a similar manner. This allows the bulb 43 and LED 33 to cease to shine at the same time.

Based on a signal input by the failure detector 54, the drive signal output unit 55 modifies the drive signals provided to the LED driver circuits 56 and 57 and bulb driver circuit 58. More specifically, when the failure detector 54 detects a break, the drive signal output unit 55 outputs drive signals to increase the blink rate of the one of the left and right directional indicators where the break was detected. When the failure detector 54 detects a short circuit, the drive signal output unit 55 outputs drive signals to turn off the one of the left and right directional indicators where the short circuit was detected.

Details of operations of the drive signal output unit 55 in response to a failure detected by the failure detector 54 will be provided below.

The LED driver circuits 56 and 57 drive the LED series circuits 35 and, at the same time, measure the current flowing through the LED series circuits 35. The bulb driver circuit 58 drives the bulbs 43 and, at the same time, measures the current flowing through the bulbs 43. In the present embodiment, the LED driver circuits 56 and 57 and bulb driver circuit 58 are implemented using integrated circuits (ICs). The LED driver circuits 56 and 57 and bulb driver circuit 58 may be implemented using other circuit components than ICs.

The LED driver circuits 56 and 57 have the same configuration; the bulb driver circuit 58 is designed for the bulbs 43 and has a different configuration than the LED driver circuits 56 and 57.

As shown in FIG. 2, the LED driver circuits 56 and 57 have LED drivers 56a and 57a, respectively, and current detectors 56b and 57b, respectively. In response to a drive signal, the LED drivers 56a and 57a cause a current to flow intermittently through the LED series circuits 35 to cause the LEDs 33 of the LED series circuits 35 to blink on and off. The current detectors 56b and 57b measure the current flowing through the LED series circuits 35.

Each of the LED driver circuits 56 and 57 has two current output terminals 56c and 56d, or 57c and 57d. The current output terminals 56c, 56d, 57c and 57d, are connected with the connection lines 31a and 32a, extending from the front left directional indicator 31 and front right directional indicator 32, respectively. That is, the two current output terminals 56c and 56d in the LED driver circuits 56 are connected with a pair of connection lines 31a and 32a, respectively, extending from the front left directional indicator 31 and front right directional indicator 32, respectively. Similarly, the two current output terminals 57a and 57d, in the LED driver circuit 57, are connected with the other pair of connection lines 31a and 32a, respectively extending from the front left directional indicator 31 and front right directional indicator 32, respectively.

Figure 3:
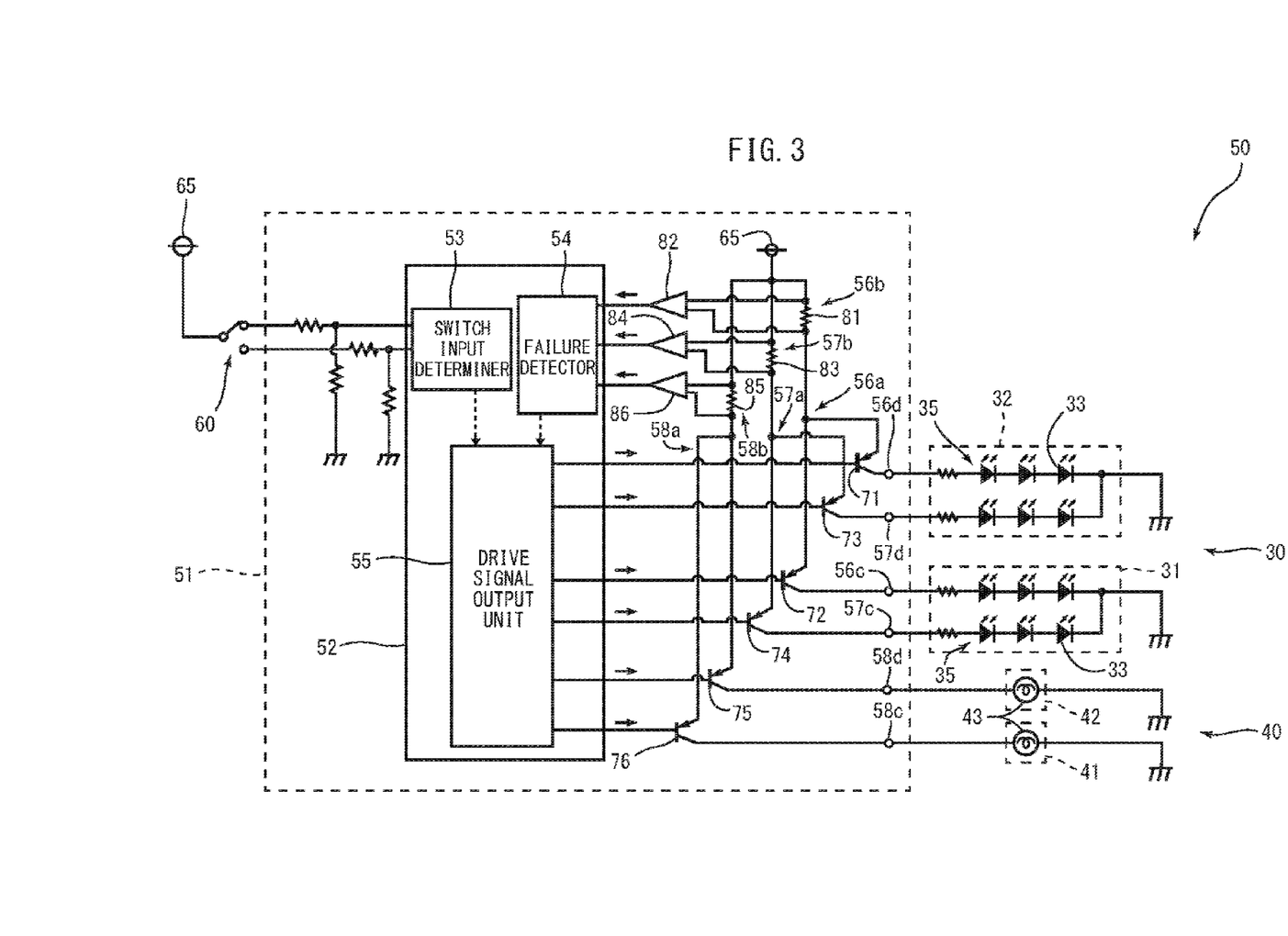
FIG. 3 illustrates details of the LED driver circuits and bulb driver circuit of FIG. 2.

As shown in FIG. 3, the LED driver 56a has switching devices 71 and 72. The switching devices 71 and 72 include transistors, for example. The switching devices 71 and 72 are connected in parallel at their emitters. The switching devices 71 and 72 each have a base that is electrically connected with the drive signal output unit 55 of the drive control unit 52. Thus, drive signals are input to the switching devices 71 and 72 from the drive signal output unit 55. The collector of each of the switching devices 71 and 72 is connected with a corresponding one of the LED series circuits 35, as detailed below. The current output terminals 56c and 56d, described above, are provided in the LED driver 56a.

In the present embodiment, as shown in FIG. 3, the switching devices 71 and 72 are PNP transistors; however, the embodiment is not limited to such a configuration and the switching devices may be NPN transistors.

The collector of the switching device 71 is connected with an LED series circuit 35 in the front right directional indicator 32 to switch between on and off for currents flowing the LED series circuit 35 based on the current input to the base. That is, the collector of the switching device 71 is connected with an LED series circuits 35 of the front right directional indicator 32 via the current output terminal 56d and connection line 32a (see FIG. 2).

The collector of the switching device 72 is connected with an LED series circuit 35 in the front left directional indicator 31 to switch between on and off for currents flowing through the LED series circuit 35 based on the current input to the base. That is, the collector of the switching device 72 is connected with an LED series circuit 35 of the front left directional indicator 31 via the current output terminal 56c and connection line 31a (see FIG. 2).

That is, in the present embodiment, the LED driver 56a has two switching devices 71 and 72 to drive the front right directional indicator 32 and front left directional indicator 31, respectively. It should be noted that the LED driver may have one or three or more switching devices to control driving of the relevant LED series circuits 35.

The current detector 56b of the LED driver circuit 56 is located upstream of the junction of the switching devices 71 and 72 connected with their LED series circuits 35, i.e. upstream of the branch point of the lines connected with these LED series circuits 35. Specifically, the current detector 56b is connected with the connection between the emitters of the switching devices 71 and 72. Thus, the current detector 56b is capable of measuring the current flowing through the switching devices 71 and 72.

The current detector 56b has a resistor 81 and a comparator 82 for obtaining the difference between the currents at the two terminals of the resistor 81. The comparator 82 is configured to determine the difference between the currents at the two terminals of the resistor 81. The difference in current across the resistor 81 obtained by the comparator 82 is input to the failure detector 54 of the drive control unit 52. The failure detector 54 detects a failure in the LED series circuits 35 based on the input value, as discussed above.

The LED driver 57a and current detector 57b of the LED driver circuit 57 are similar to the LED driver 56a and current detector 56b of the above LED driver circuit 56, and a detailed description thereof will not be made. In FIG. 3, characters 73 and 74 designate the switching devices of the LED driver 57a, while characters 83 and 84 designate the resistor and comparator, respectively, of the current detector 57b. The current output terminals 57c and 57d are provided in the LED driver 57a.

As shown in FIG. 2, the bulb driver circuit 58 has a bulb driver 58a and current detector 58b. The bulb driver 58a causes a current to flow through the bulbs 43 intermittently to cause the bulbs 43 to blink. The current detector 58b measures the current flowing through the bulbs 43. Similarly to the LED driver circuits 56 and 57, the bulb driver circuit 58 has two current output terminals 58c and 58d. The current output terminals 58c and 58d are connected with connection lines extending from the rear left directional indicator 41 and rear right directional indicator 42, respectively.

As shown in FIG. 3, similarly to the above LED driver 56a, the bulb driver 58a has switching terminals 75 and 76. The switching terminals 75 and 76 have a configuration similar to that of the above switching devices 71 and 72 except that their collectors are connected with the bulbs 43 of the rear right directional indicator 42 and rear left directional indicator 41 via the current output terminals 58d and 58c. As such, a detailed description of the switching devices 75 and 76 will not be made. The current output terminals 58c and 58d are provided in the bulb driver 58a.

Similar to the above current detector 56b, the current detector 58b has a resistor 85 and a comparator 86. Again, the resistor 85 and comparator 86 have a configuration similar to that of the resistor 81 and comparator 82 of the above current detector 56b, and a detailed description thereof will not be made.

Thus, the bulb driver circuit 58 for driving the bulbs 43 has two switching devices 75 and 76 to drive the rear right directional indicator 42 and rear left directional indicator 41, respectively. The current flowing through the rear right directional indicator 42 and rear left directional indicator 41 is measured by the current detector 58b and input to the failure detector 54. It should be noted that the driver circuit may have one or three or more switching devices to control driving of the bulbs 43.

In the present embodiment, each of the LED driver circuits 56 and 57 and bulb driver circuit 58 has two switching devices for driving corresponding ones of the LED series circuits 35 or a corresponding one of the bulbs 43. This results in a reduced number of driver circuits compared with arrangements where a driver circuit with one switching device is connected with each of the LED series circuits 35 and bulbs 43. As the number of components is reduced, the configuration of the driver 51 is simplified and its size is reduced.

The LED driver circuits 56 and 57 and bulb driver circuit 58 are electrically connected with the left and right directional indicator sets. More specifically, in the LED driver circuits 56 and 57 and bulb driver circuit 58, for each pair of switching devices, one switching device is electrically connected with the left directional indicator set and the other switching device is electrically connected with the right directional indicator set. Thus, when one of the left and right directional indicator sets is being operated, only one of the two switching devices in each of the LED driver circuits 56 and 57 and bulb driver circuit 58 is operated. As such, one current detector may be provided for each of the LED driver circuits 56 and 57 and bulb driver circuit 58 to measure the current flowing through the switching devices that are being operated at a given time. This eliminates the necessity to provide a current detector for each switching device. This results in a reduced size of the driver circuit.

(Failure Detection)

Next, the control flow for detecting a failure in the LED series circuits 35 and bulbs 43 in the directional indicator system 50 having the above configuration will be described with reference to FIG. 5. While the description below illustrates the detection of a failure in the LED series circuits 35, the same applies to the detection of a failure in the bulbs 43. The drive control unit 52 is configured to perform the flow of FIG. 5 at predetermined time intervals.

Figure 5:
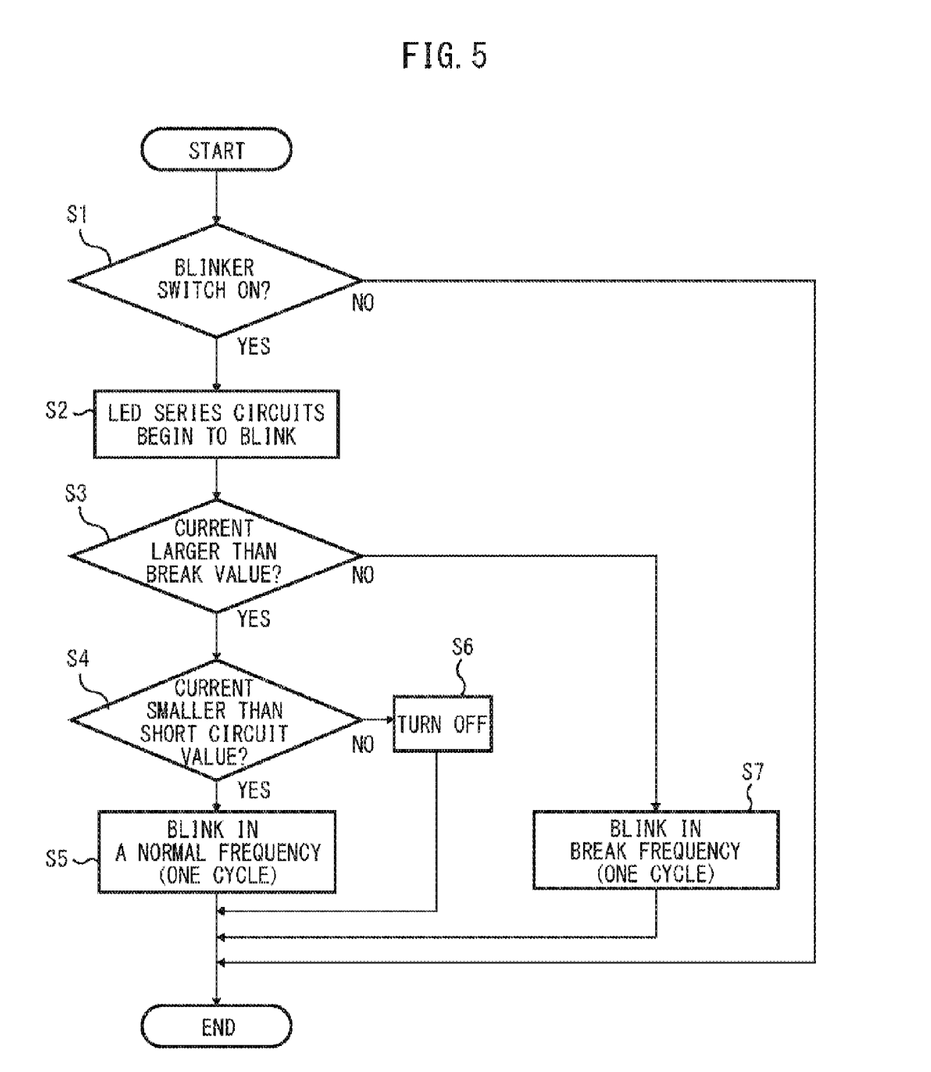
FIG. 5 is a flow chart illustrating failure detection by the drive control unit.

Upon initiation of the flow of FIG. 5 (START), it is determined whether the blinker switch 60 is on at step S1. If it is determined that the blinker switch 60 is on at step S1 (YES), the LED series circuits 35 of the one of the left and right directional indicator sets that has been operated by the blinker switch 60 begin to blink at step S2. If it is determined that the blinker switch 60 is not on at step S1 (NO), the flow ends (END).

After the relevant LED series circuits 35 (i.e., the LED series circuits 35 that compose the front right directional indicator 32 or the LED series circuits 35 that compose the front left directional indicator 31) begin to blink at step S2, it is determined whether the currents measured by the current detectors 56b, 57b are each larger than the break current value for an LED series circuit 35 at step S3. If it is determined that each of the currents is larger than the break current value for an LED series circuit 35, i.e. it is determined that there is no break in the LED series circuits 35 (YES), it is determined whether there is a short circuit in the LED series circuits 35 at step S4.

If, at step S3, it is determined that one or more of the currents measured by the current detectors 56b, 57b is not larger than the break current value for the LED series circuits 35 (NO), the control proceeds to step S7, where the LED series circuits 35 blink for one cycle in a frequency for a break. This blinking frequency for a break is higher than the normal blinking frequency.

If, at step S4, it is determined that the currents measured by the current detectors 56b, 57b are each smaller than the short circuit current value for LED series circuits 35 (YES), there is neither a break nor a short circuit in the LED series circuits 35. Accordingly, at step S5, the LED series circuits 35 blink on and off for one cycle in the normal frequency. If, at step S4, it is determined that one or more of the currents is equal to or larger than the short circuit current value for an LED series circuit 35 (NO), it is estimated that there is a short circuit in an LED series circuit 35, and this LED series circuit 35 is turned off at step S6.

After the LED series circuits 35 blink in the frequency for a break at step S7, or after the LED series circuits 35 blink in the normal frequency at step S5 or after the LED series circuits 35 are turned off at step S6 and the flow ends (END).

In the present embodiment, a directional indicator system 50 includes a front directional indicator 30 and a driver 51 for controlling driving of the front directional indicator 30. The front directional indicator 30 includes a plurality of LED series circuits 35, each LED series circuit having a plurality of LEDs 33 connected in series. The LED series circuits 35 are connected in parallel. The driver 51 includes a plurality of LED driver circuits 56 and 57 each for driving a corresponding one of the plurality of LED series circuits 35 and current detectors 56b and 57b each for measuring the value of current in a corresponding one of the plurality of LED series circuits 35. As the value of the current flowing through each of the plurality of LED series circuits 35 is detected, a failure in the LED series circuits 35 can be detected more correctly. Thus, a failure of an LED 33, such as a break, may be detected more correctly.

In the present embodiment, the driver 51 further includes a failure detector 54 for determining the one of the plurality of LED series circuits 35 that has a failure based on the value of current measured by the current detectors 56b and 57b. Thus, the failure detector 35 is capable of determining whether there is a failure in the plurality of LED series circuits 35. This will make it possible to easily detect an LED series circuit with a failure even when LEDs 33 passing a smaller amount of current than bulbs are used.

In the present embodiment, the driver 51 includes a plurality of LED driver circuits 56 and 57 having the plurality of LED drivers 56a and 57a, respectively. Current detectors 56b and 57b are provided in the LED driver circuits 56 and 57 to correspond to the LED drivers 56a and 57a. This will allow the LED drivers 56a and 57a and current detectors 56b and 57b to be constructed from a single circuit component. This will result in a reduced number of components of the driver 51, leading to a reduced size of the driver 51.

In the present embodiment, the driver 51 includes a drive control unit 52 for outputting a drive signal to the plurality of LED driver circuits 56 and 57. The failure detector 54 is provided in the drive control unit 52. This will allow the drive control unit 52 to efficiently detect a failure in the plurality of LED series circuits 35.

In the present embodiment, the directional indicator 30 is provided on the left and right sides of the vehicle. At least one of the plurality of LED drivers 56a and 57a has at least two current output terminals 56c, 56d, 57c and 57d. At least one of the current output terminals is connected with an LED series circuit 35 of the front left directional indicator 31 located on the left side of the vehicle. At least one of the other current output terminals is connected with an LED series circuit 35 of the front right directional indicator 32 located on the right side of the vehicle.

This will result in a reduced number of LED drivers. That is, each LED driver is connected with an LED series circuit 35 of the front left directional indicator 31 and an LED series circuit 35 of the front right directional indicator 32. Thus, the above arrangement has a reduced number of LED drivers compared with arrangements where an LED driver is provided for every one of the LED series circuits.

In the present embodiment, the directional indicator system 50 further includes a rear directional indicator 40 having bulbs 43. The driver 51 includes a driver circuit 58 for driving the bulbs 43. This will realize a motorcycle 1 including a front directional indicator 30 having LED series circuits 35 and a rear directional indicator 40 having bulbs 43.

In the present embodiment, the current detectors 56b, 57b and 58b are provided to correspond to the LED drivers 56a, 57a and bulb driver 58a, respectively. This will make it possible to detect a failure in the LED series circuits 35 and bulbs 43.

In the present embodiment, the driver 51 includes a drive control unit 52 for outputting a drive signal to the LED driver circuits 56 and 57 and bulb driver circuit 58. The drive control unit 52 causes a drive signal to be output to the LED driver circuits 56 and 57 at a different point of time than a drive signal to be output to the bulb driver circuit 58. Thus, even when bulbs that take a longer time until they are turned on than LEDs are combined with LEDs, the bulbs and LEDs can be turned on in a synchronized manner.

In the present embodiment, the front directional indicator 30 is located in a front portion of the motorcycle 1. The rear directional indicator is located in a rear portion of the motorcycle 1. Disposing the front directional indicator 30 having LED series circuits 35 in the front portion of the motorcycle 1 will improve the design of the front portion of the vehicle.

In the present embodiment, the front directional indicator 30 includes a plurality of connection lines 31a and 32a connected with their respective LED series circuits 35. The plurality of connection lines 31a and 32a are each configured to connect one of the LED series circuits 35 with one of the plurality of LED driver circuits 56 and 57. This will make it possible to easily detect a failure in a plurality of LED series circuits 35 than in a directional indicator connected with the LED driver circuits via a single line.

Other Embodiments

Although embodiments of the present invention have been described, the above embodiments are merely examples that can be used to carry out the present invention. Thus, the present invention is not limited to the above embodiments, and the above embodiments may be modified as appropriate without departing from the spirit of the invention.

In the above embodiment, LED series circuits 35 are only used in the front directional indicator 30. Alternatively, LED series circuits 35 may be used in the rear directional indicator 40, or may be used in both the front and rear directional indicators 30 and 40.

In the above embodiment, the current detectors 56b, 57b and 58b are provided in the LED driver circuits 56 and 57 and driver circuit 58, respectively. Alternatively, the current detectors 56b, 57b and 58b may be provided separately from the LED driver circuits 56 and 57 and bulb driver circuit 58.

In the above embodiment, the LED drivers 56a and 57a having switching devices 71 to 74 are provided on the high-potential side of the LED series circuits 35, where the switching devices 71 to 74 are used to control the current flowing into the LED series circuits 35. Alternatively, the switching devices may be provided on the low-potential side of the LED series circuits 35, where the switching devices are used to control the current flowing into the LED series circuits 35.

In the above embodiment, the drive control unit 52 delays the output of drive signals to the LED drivers 56a and 57a relative to the output of drive signals to the bulb driver 58a. Alternatively, the drive control unit 52 may advance the output of drive signals to the LED drivers 56a and 57a relative to the output of drive signals to the bulb driver 58a. That is, it is sufficient if the drive control unit 52 causes drive signals to be output to the LED driver circuits 56a and 57a at a different point of time than drive signals to be output to the bulb driver circuit 58a.

In the above embodiment, LEDs 33 are used as light emitters in the front directional indicator 30, while bulbs 43 are used as light emitters in the rear directional indicator 40. Alternatively, both LEDs 33 and bulbs 43 may be used as light emitters in at least one of the front directional indicator and rear directional indicator. In such cases, too, it is preferable that drive signals may be output to the LED drivers and the bulb drivers at different points of times to cause the LEDs 33 and bulbs 43 to be turned on at the same time.

What is claimed is:

1. A straddle type vehicle directional indicator system, comprising:
    left and right directional indicators, the left directional indicator being provided on a left side of the vehicle and the right directional indicator being provided on a right side of the vehicle, each respective directional indicator of the left and right directional indicators including a plurality of LED series circuits so that each of the LED series circuits of the respective directional indicator is connected in parallel to another of the LED series circuits of the respective directional indicator, each LED series circuit having a plurality of LEDs connected in series; and
    a driver configured to control driving of the left and right directional indicators, the driver including
        a plurality of LED drivers each configured to drive a corresponding one of the LED series circuits of the left directional indicator and a corresponding one of the LED series circuits of the right directional indicator, and
        a plurality of current detectors each configured to measure a value of a current in a corresponding one of the LED series circuits of the left directional indicator and a value of a current in a corresponding one of the LED series circuits of the right directional indicator,
    one of the LED drivers has a plurality of current output terminals including a first current output terminal and a second current output terminal different from the first current output terminal, and
    the first current output terminal is connected with one of the LED series circuits of the left directional indicator, and the second current output terminals is connected with one of the LED series circuits of the right directional indicator.

2. The straddle type vehicle directional indicator system according to claim 1, wherein the driver further includes a failure detector configured to determine whether one of the LED series circuits of the left and right directional indicators has a failure based on the values of the currents of the left and right directional indicators measured by the current detectors.

3. The straddle type vehicle directional indicator system according to claim 2, wherein the driver further includes a plurality of LED driver circuits that each includes
    a respective one of the LED drivers, and
    one of the current detectors that corresponds to the respective one LED driver.

4. The straddle type vehicle directional indicator system according to claim 2, wherein
    the driver includes a drive control unit configured to output drive signals to the plurality of LED drivers, and
    the failure detector is a part of the drive control unit.

5. The straddle type vehicle directional indicator system according to claim 1, further comprising a bulb body directional indicator having a bulb body, wherein the driver includes a bulb driver configured to drive the bulb body,
    wherein the bulb body takes a longer time to reach a predetermined brightness of lighting than the pluralities of LEDs of the left and right directional indicators from a point of time where a current begins to flow through the bulb body and the pluralities of LEDs of the left and right directional indicators.

6. The straddle type vehicle directional indicator system according to claim 5, wherein the current detectors are provided to correspond to each of the LED drivers and the bulb driver.

7. The straddle type vehicle directional indicator system according to claim 5, wherein
    the driver further includes a drive control unit configured to output drive signals to the LED drivers and a drive signal to the bulb driver, and
    the drive control unit causes one or more of the drive signals that are output to the LED drivers to be output at a different point of time than the drive signal output to the bulb driver.

8. The straddle type vehicle directional indicator system according to claim 7, wherein the drive control unit causes the one or more drive signals that are output to the LED drivers to be output after the drive signal output to the bulb driver.

9. A straddle type vehicle including the straddle type vehicle directional indicator system according to claim 5, wherein
    the left and right directional indicators are located in a front portion of the vehicle, and
    the bulb body directional indicator is located in a rear portion of the vehicle.

10. The straddle type vehicle directional indicator system according to claim 1, further comprising:

a plurality of connection lines that are each configured to connect one of the plurality of LED series circuits of the left and right directional indicators with one of the LED drivers.

11. The straddle type vehicle directional indicator system according to claim 1, further comprising a failure detector for determining whether any of the LED series circuits of the left and right directional indicators has failed based on the values of the currents of the left and right directional indicators by comparing each of the values to a break current value which corresponds to a break in a failed LED series circuit.

12. The straddle type vehicle directional indicator system according to claim 11, further wherein the failure detector detects that a failed one of the LED series circuits of the left and right directional indicators has failed when one of the values, that corresponds to the failed one LED series circuit, is less than the break current value.

13. The straddle type vehicle directional indicator system according to claim 12, further wherein the driver controls the failed one LED series circuit to blink in a frequency cycle that is different than a frequency cycle used when there is no failure in the failed one LED series circuit.

14. The straddle type vehicle directional indicator system according to claim 1, further comprising a failure detector for determining whether any of the LED series circuits of the left and right directional indicators has failed based on the values of the currents of the left and right directional indicators by comparing each of the values to a short circuit value which corresponds to a short circuit in a failed LED series circuit.

15. The straddle type vehicle directional indicator system according to claim 14, further wherein the failure detector detects that a failed one of the LED series circuits of the left and right directional indicators has failed when one of the values, that corresponds to the failed one LED series circuit, is greater than the short circuit value.

16. The straddle type vehicle directional indicator system according to claim 15, further wherein the driver controls the failed one LED series circuit to be in an off-state so that the failed one LED series circuit cannot be driven to be turned into an on-state.

17. The straddle type vehicle directional indicator system according to claim 1, wherein the current detectors includes comparators which measure the values of the currents of the left and right directional indicators.

18. The straddle type vehicle directional indicator system according to claim 1, wherein each of the LED drivers is configured to drive the corresponding one of the LED series circuits of the left directional indicator and the corresponding one of the LED series circuits of the right directional indicator each at a different time, each of the current detectors is configured to measure the values of currents of the corresponding one of the LED series circuits of the left directional indicator and the corresponding one of the LED series circuits of the right directional indicator each at a different time.

* * * * *